(12) United States Patent
Isaac et al.

(10) Patent No.: US 7,731,576 B2
(45) Date of Patent: Jun. 8, 2010

(54) RIGID ROTOR DISCHARGE DEFLECTOR

(75) Inventors: Nathan E. Isaac, Leola, PA (US);
Jonathan E. Ricketts, Ephrata, PA (US);
Bradley J. Wagner, Wrightsville, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/384,383

(22) Filed: Apr. 3, 2009

(65) Prior Publication Data

US 2009/0197656 A1 Aug. 6, 2009

Related U.S. Application Data

(62) Division of application No. 11/804,118, filed on May 17, 2007, now abandoned.

(60) Provisional application No. 60/808,370, filed on May 25, 2006.

(51) Int. Cl.
*A01F 12/44* (2006.01)
(52) U.S. Cl. ........................................ 460/84
(58) Field of Classification Search .................... 460/8, 460/59, 65–73, 84, 107–111, 120–122
See application file for complete search history.

(56) References Cited

U.S. PATENT DOCUMENTS

| | | | |
|---|---|---|---|
| 1,509,833 A | 9/1924 | Gilman | |
| 1,729,199 A * | 9/1929 | Wood | 460/84 |
| 2,174,836 A | 10/1939 | Range | 209/270 |
| 2,246,352 A | 6/1941 | Falkiner | 209/21 |
| 2,383,911 A * | 8/1945 | Dray | 460/13 |
| 3,199,441 A | 8/1965 | Haug | 100/157 |
| 3,863,643 A | 2/1975 | DePauw | 130/27 T |
| 4,175,568 A | 11/1979 | Nooyen | 130/27 T |
| 4,177,820 A * | 12/1979 | Rowland-Hill | 460/66 |
| 4,254,780 A | 3/1981 | Powell et al. | 130/27 T |
| 4,306,572 A | 12/1981 | Campbell et al. | 130/27 T |
| 4,677,991 A * | 7/1987 | Harris et al. | 460/8 |
| 4,706,690 A | 11/1987 | Huhman | 130/27 P |
| 4,875,890 A | 10/1989 | Margerum et al. | 460/68 |
| 5,145,461 A | 9/1992 | Tanis | 460/67 |
| 5,342,239 A | 8/1994 | West et al. | 460/69 |
| 5,344,367 A | 9/1994 | Gerber | 460/68 |
| 6,241,605 B1 | 6/2001 | Pfeiffer et al. | 460/69 |
| 6,352,474 B1 | 3/2002 | Payne et al. | 460/66 |

(Continued)

*Primary Examiner*—Thomas B Will
*Assistant Examiner*—Joan D Misa
(74) *Attorney, Agent, or Firm*—Michael G. Harms; John William Stader; Patrick M. Sheldrake

(57) ABSTRACT

A rigid rotor discharge deflector apparatus for a combine has a body member that is attachable to the side wall of a discharge passage at the downstream end of the rotor. The body has a face portion with at least one ridge portion thereon extending generally laterally across at least a portion of the face portion. The body also has an upper body portion above the level of the ridge portion, an upper ramp portion sloped and extending outwardly from the upper body portion to the ridge portion, and a bracing associated with the upper ramp portion maintaining the ridge portion essentially fixed relative to the side wall. The body member may also include a lower body portion below the level of the ridge portion, and the upper and lower body portions may both be attachable to the side wall.

11 Claims, 11 Drawing Sheets

U.S. PATENT DOCUMENTS

| | | | |
|---|---|---|---|
| 6,500,063 B1 | 12/2002 | Gryspeerdt | 460/79 |
| 6,517,431 B2 | 2/2003 | Schwersmann | 460/16 |
| 6,679,773 B2 * | 1/2004 | Schwersmann | 460/70 |
| 6,755,735 B2 * | 6/2004 | Linder et al. | 460/119 |
| 6,979,261 B1 | 12/2005 | Day et al. | 460/59 |

* cited by examiner

RIGID ROTOR DISCHARGE DEFLECTOR

This divisional application claims the benefit of U.S. Provisional Application No. 60/808,370, filed May 25, 2006. This divisional application also claims priority under 35 U.S.C. §0 from co-pending U.S. patent application Ser. No. 11/804,118 filed on May 17, 2007 now abandoned by Nathan E. Isaac et al, with the same title, the full disclosure of which is hereby incorporated by reference.

TECHNICAL FIELD

This invention relates generally to an apparatus for transitioning a flow of crop residue in an agricultural combine from an axially arranged threshing or separating system of such combine to a following beater or integrated chopper so as to effect better distribution of the residue across the width of the beater or chopper, and, more particularly, to an apparatus including a fixed or rigid rotor discharge deflector positioned so as to be impinged by the greater flow of crop residue being discharged at one side of an axially extending rotor and concave assembly of the threshing or separating system and to deflect a portion of such flow so as to better distribute the crop residue across the width of the beater or chopper as the crop residue is introduced into the beater or chopper.

BACKGROUND ART

Axially arranged rotary threshing or separating systems have long been in use in agricultural combines for threshing crops to separate grain from crop residue, also referred to as material other than grain (MDG). Such axially arranged systems typically include at least one cylindrical rotor rotated within a concave or cage, with the rotor and surrounding concave being oriented so as to extend forwardly to rearwardly within the combine.

In operation, crop material is fed or directed into a circumferential passage between the rotor and the concave, hereinafter ref erred to as a rotor residue passage, and is carried rearwardly along a generally helical path in such passage by the rotation of the rotor as grain is threshed from the crop material. The flow of crop residue or MDG remaining between the rotor and concave after threshing is typically discharged or expelled by the rotating rotor at a rear or downstream end of the rotor and the rotor residue passage in a generally downward, or a downward and sidewardly, direction in what is a continuation of the helical path of movement of the crop residue within the rotor residue passage between the rotor and concave.

The flow is typically discharged into a discharge opening at the downstream end of the rotor and into a further passage, hereinafter referred to as a discharge passage or discharge chute, that extends downwardly and somewhat rearwardly into a crop residue distribution system located below and rearwardly of the rear end of the threshing system, which crop residue distribution system typically includes a laterally disposed rotary beater or chopper that beats or chops the crop residue into smaller pieces and propels the resulting chopped crop residue rearwardly within a rear end of the combine for either discharge from the combine through a rear opening onto a field or introduction into a residue spreader apparatus, which residue spreader apparatus may include a further chopper and/or spreader, mounted on the rear end and operable for spreading the residue over a swath of a field.

Due to the nature of operation of the threshing rotor, the design of such rotor and concave, and the helical movement of the crop residue within the rotor residue passage, the resulting flow of crop residue from the rotor residue passage into the discharge opening is often greater on the downward sweep side of the rotor than on the upward sweep side, as a consequence of which an uneven flow of crop residue is presented across the width of the discharge opening and so introduced into the beater or chopper. Such uneven input flow has typically, in the past, resulted in inefficient operation of the beater or chopper, uneven wear of components of the beater or chopper, and poor material conveyance from the beater or chopper to the residue spreader apparatus at the rear of the harvester.

Since the flow of crop residue as introduced into the beater or chopper is often considerably heavier at one side of the beater or chopper, the crop mat introduced into the beater or chopper is often too thick for the beater or chopper to effectively handle, as a consequence of which the chop quality of the residue discharged from the beater or chopper is often less than desirable. Because the components of the beater or chopper which are associated with the side of the beater or chopper that experiences such heavier flow are subjected to greater abuse, they wear more quickly, thus degrading the performance of the beater or chopper over time, especially on the side handling the heavier flow. As a consequence, the output flow of residue from the beater or chopper often exhibits both uneven chop quality and uneven distribution across the width of the beater or chopper, with the heavier concentration of the poorly chopped residue remaining concentrated along the side of heavier flow from the threshing rotor as the crop residue proceeds toward the residue spreader. Such uneven flow across the width of the beater or chopper poses difficulties for the combine users.

Combine users desire, in many instances, when the crop residue is to be spread in a swath over a field, that the crop residue be distributed evenly or uniformly over the swath. Uniform distribution is desirable for a number of reasons. Included among such reasons are that uneven crop residue distribution on a field can lead to temperature and moisture gradients detrimental to even growth of future crops on the field, uneven distribution can make it difficult for crops to utilize nutrients, and uneven distribution can impact the effectiveness of agricultural chemicals. In addition, the existence of large discontinuities of spread crop residue can lead to plugging and other functional problems when such discontinuities are encountered by tillage and/or planting equipment.

It has been recognized that one factor that affects the ability of a residue spreader to distribute crop residue evenly or uniformly over a field is the transverse or side to side evenness of crop residue inflow into the residue spreader. However, the side to side uniformity of the infeed to the residue spreader is directly related to the side to side uniformity of the output flow from the beater or chopper, and since such output flow is recognized to be a function of the side to side distribution of crop residue infeed into the beater or chopper from the threshing system, it is therefore desirable to be able to effect a relatively uniform distribution of crop residue across the width of the beater or chopper, or at least to be able to more evenly distribute the flow being discharged from the threshing rotor.

In light of the foregoing considerations, several devices and structures have been developed to try to improve and better distribute the flow of crop residue from axially arranged threshing systems into crop residue distribution systems, including constructions such as are disclosed in Payne et al. U.S. Pat. No. 6,352,474 entitled Metering Edge for Axially Arranged Rotary Separator, which discloses the use of a relatively thin projecting asymmetrical arcuate assembly adjacent approximately the lower half of the concave of the combine with a metering edge overhanging the discharge chute from the rotor residue passage into the beater or chopper, and Pfeiffer et al. U.S. Pat. No. 6,241,605 entitled Discharge Geometry for Axially Arranged Rotary Separator, which discloses use of a deflector at the downstream end of the threshing rotor that extends into the flow passageway and has a relatively thin and flexible free end with upper and lower metering edges for metering the flow of residue to a discharge chute with guide vanes for introduction into the beater or chopper.

Although the above referenced constructions may offer improved performance, they employ and require the use of metering edges as part of their constructions in attempts to obtain improved flow of crop residue. Moreover, the required metering edges of such constructions are subject to significant abuse, especially for heavy crop residue flows, and the relatively thin overhanging arcuate assembly of Payne et al. U.S. Pat. No. 6,352,474 and the relatively thin free end of the deflector in the construction of Pfeiffer et al. U.S. Pat. No. 6,241,605, due to their design characteristics, including their flexure characteristics as force is applied thereto, can be significantly affected in heavy flow situations and subject to damage or distortion if the rotor is caused to operate in reverse mode, such as in the event of a plugged condition.

Consequently, what has continued to be sought is a discharge deflector that can positioned to interact with the crop residue flow from the threshing rotor, that does not require metering edges, and which can better withstand the wear and tear of use without significant flexure or distortion in heavy flow situations or in the event of rotor reversals, to effect a better distribution of crop residue introduced onto the beater or chopper of an agricultural combine, which improved distribution can result in more efficient operation of the beater or chopper, better chop quality from the beater or chopper, and more even throughput of crop residue to the residue spreader.

SUMMARY OF THE INVENTION

What is disclosed is a rigid rotor discharge deflector apparatus for better distributing crop residue from an axially arranged threshing system of a combine to a crop residue distribution system that overcomes one or more of the problems and disadvantages set forth hereinabove and which achieves the improved performance and reliability as also discussed hereinabove.

Such apparatus is especially useful with agricultural combines and like equipment, including combines which include an axially arranged threshing system having at least one rotor rotatable within a concave for moving crop residue along an internal rotor residue passage and discharging a flow of crop residue into and through a rearwardly located, generally downwardly facing discharge passage to a crop residue distribution system, including a beater or chopper, of the combine.

The rigid rotor discharge apparatus includes a body member securably positionable, such as by attachment to a side wall, at the downswept side of the rotor in the discharge passage leading to the beater or chopper of the combine and sized such that, when securably attached to the side wall, it extends along such side wall from generally adjacent the downswept downstream end of the rotor rearwardly towards the rear of the combine within the discharge passage. Such securably attached body member includes a face portion having at least one ridge portion thereon extending generally laterally across at least a portion of the face portion, an upper body portion above the level of the ridge portion, and an upper ramp portion sloped and extending outwardly in a fixed, inflexible manner, such as at a fixed angle $\alpha$ relative to the side wall, from the upper body portion to the ridge portion, and a bracing associated with the upper ramp portion maintaining the ridge portion essentially fixed relative to the side wall and the upper ramp portion in the fixed manner, such as at essentially the fixed angle $\alpha$. The upper ramp portion is dimensioned to extend into the discharge passage sufficiently to be impacted by at least a portion of the crop residue being discharged by the rotor into the discharge passage. Due to its design characteristics, including the bracing, such apparatus is thus positionable to intercept at least a portion of the crop residue being discharged by the rotor into the discharge passage, and the crop residue will impact the upper ramp portion without effecting flexure thereof and will be deflected and redirected thereby across the discharge passage to be more uniformly introduced into the beater or chopper apparatus.

The body member may also include a lower body portion below the level of the ridge portion, and the upper and lower body portions may both be attachable to the side wall. Preferably, a lower ramp portion may also be provided, which lower ramp portion slopes and extends in a given manner from the ridge portion back towards the lower body portion, such as at a given angle $\beta$ relative to the side wall. Such features may form a portion of the bracing for the upper ramp portion and also provide further benefit in the event of rotor reversal operations by deflecting the reverse flow and preventing buildup of crop residue behind the upper ramp portion and/or the application of undue pressure against the backside of the upper ramp portion that might otherwise damage or distort the upper ramp portion.

The ridge portion typically will include a lip therewith, such as at the juncture of upper and lower ramp portions, which lip may be at a generally uniform distance from the side wall or which may have opposite ends at different distances from the side wall, with the end closer to the wall being a lower end and the end farther from the wall being a higher end, and may slope generally uniformly outwardly from the lower end to the higher end. If the upper and lower body portions are generally plate-like portions resting against the side wall, the upper and lower ramp portions may generally define a wedge-like shape with the faces of the upper and lower ramp portions each having a generally triangular configuration.

In some instances, it may be desirable to be able to deflect and to divert the crop residue into multiple paths. In such instances, the rigid rotor discharge deflector may include a plurality of distinguishable ridge portions and associated upper ramp portions and bracings, and such associated upper ramp portions may have the same or different slopes, with ridge portions therefor at the same or different vertical locations on the face of the body member.

The rigid rotor discharge deflector may be formed from a unitary member or may be an assemblage of discrete components. For one preferred form of the invention, the deflector may be formed from a unitary plate-like member, typically rectangular in shape, which is formed from a material and is of a thickness that can withstand the application of force thereto such as would be encountered due to the continuing impact of crop residue during the normal course of operation of a combine. Such unitary member may then, under the application of suitable force that exceeds forces to which the member would be subjected in the course of ordinary operation of a combine, be generally horizontally bent back on itself at a mid-height position to define a primary bend and upper and lower side portions on the upper and lower sides of the primary bend. A generally horizontal counter-bend may be applied to each of such upper and lower side portions at intermediate locations between the primary bend and the respective upper and lower edges of the upper and lower side portions to form flange portions along such edges. The plate-like member as so bent would thus have a configuration resembling a V-shape rotated by 90°, with the leg portions of the V-shape defining oppositely sloped upper and lower ramp portions. The slopes of such ramp portions may, but need not be, essentially the same. The flange portions so formed may be attachable to the side wall by various types or forms of connection devices or techniques, including, by way of example and not of limitation, nut and bolt connections and welding techniques.

If, instead of applying a horizontal counter-bend to each of the upper and lower side portions, angled counter-bends, each terminating at about the same end of the primary bend, were applied to the upper and lower side portions, the resulting configuration would be that of a flat plate with upper and lower flange portions and having a generally triangular wedge rising from the surface to a peak, with the sloped upper and lower sides of the wedge being of approximately triangular shapes and defining upper and lower ramp portions, the slopes of which may, but need not be, essentially the same. The upper and lower flange portions could be similarly attachable to the side wall by various types or forms of connection devices or techniques.

With such forms of the invention, the lower flange and ramp portions serve as bracing for the upper ramp portions to inhibit and prevent flexure or distortion of the upper ramp portions as they are impacted by the flow of crop residue during operation of the combine and to ensure the rigidity of the rotor discharge deflector of the invention. Depending upon the particular form and characteristics of any given deflector and the combine with which it may be employed and the conditions of use, other or additional bracing may be utilized or considered desirable or advisable. Such bracing could include features such as one or more supports, or a solid supporting structure, beneath or extending to the backside or to the sides of the upper ramp portion, or may even include the use of a material of suitable thickness for the upper ramp portion such that the upper ramp portion will remain essentially inflexible under normal conditions of use of the combine.

In such regard, it should be appreciated that, for purposes of discussion herein, use of terms such as "inflexible" and "fixed", especially relative to angles and distances, and with reference to various materials or structures or features, are intended to be applicable to ordinary and normal conditions, and not to extreme or extraordinary conditions, since under extreme or extraordinary conditions, distortions or changes could occur or be expected. In general, unless otherwise indicated, these and all such like terms should be considered to apply to ordinary and normal conditions and uses, and to ordinarily detectable or observable changes under such conditions or during such uses, and not to changes or differences that would be considered to fall within normal variances or which would be considered minute or to be detectable only by sophisticated or non-standard equipment or which would be expected under extreme or extraordinary conditions or uses.

Other and additional embodiments of the invention and forms of features or components thereof, as well as a further and more complete understanding of the invention, may be derived and will become apparent from a consideration of the following detailed specification in conjunction with the accompanying drawings, wherein:

DETAILED DESCRIPTION OF THE INVENTION

Figure 1:
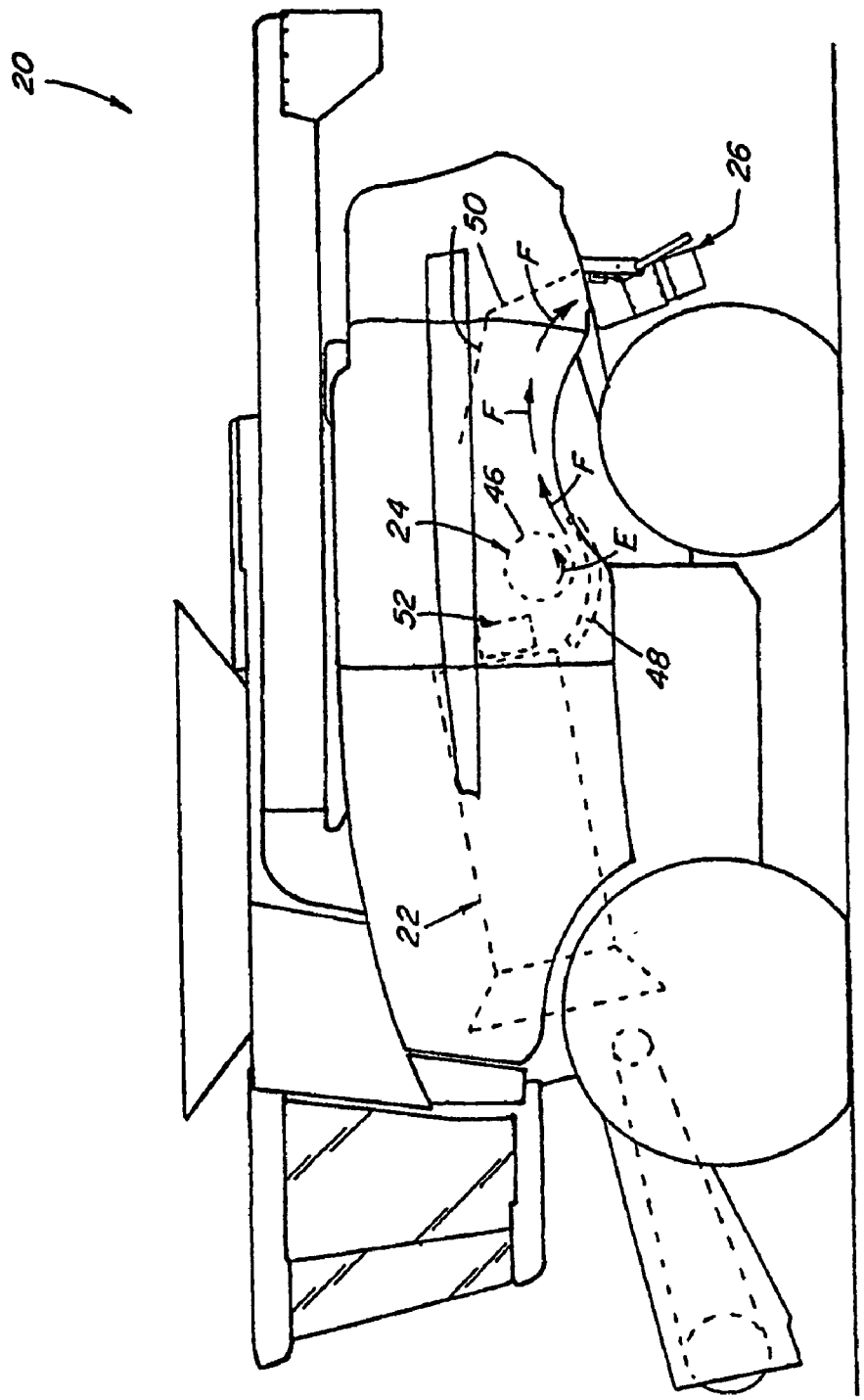
FIG. 1 is simplified side plan view of agricultural combine, illustrating in dotted lines an axially arranged threshing system of the combine, and a rigid rotor discharge deflector apparatus for more uniformly directing crop residue flow from the threshing system to a beater or chopper of the combine.

Referring now to the drawings, wherein several preferred embodiments of the present invention are shown and wherein like numerals refer to like or similar items or features, FIG. 1 depicts a representative agricultural combine 20 that includes an axially arranged threshing system 22 and a crop residue distribution system 24 that includes a beater or chopper 46, all of well known construction and operation.

Figure 2:
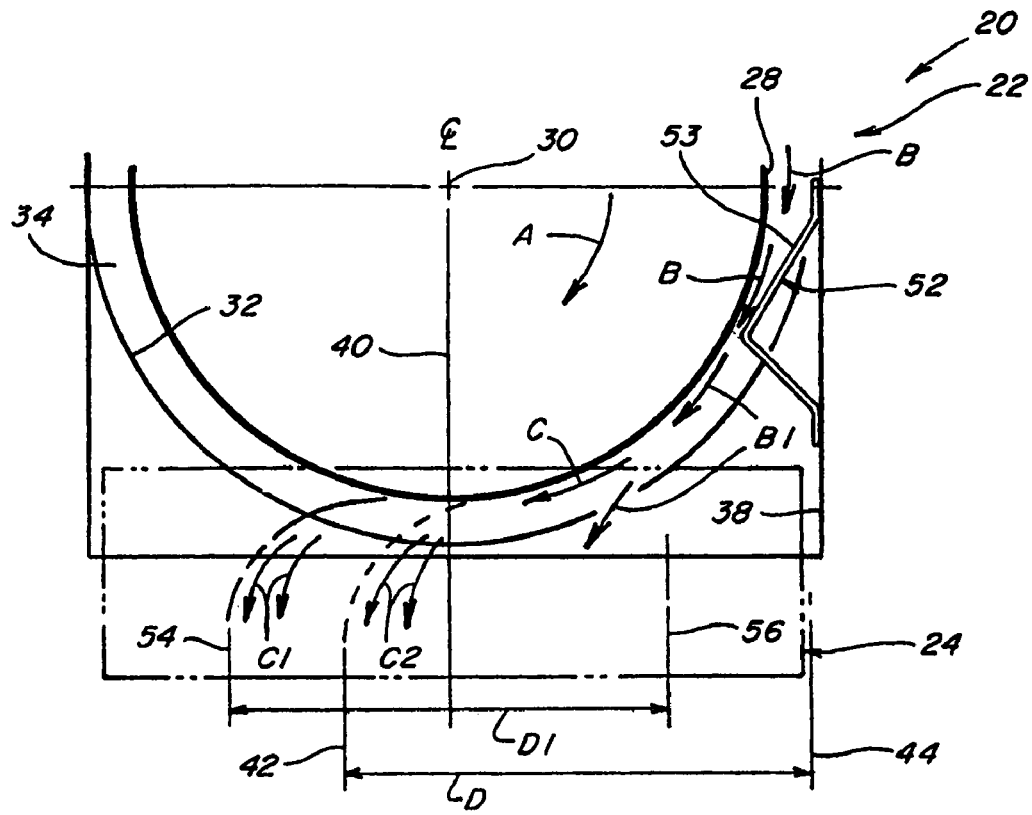
FIG. 2 is a simplified plan view at the rear of the rotor of the combine of FIG. 1, showing the threshing system and a preferred form of the deflector apparatus of the invention, and illustrating in phantom a path of crop residue flow expelled from the threshing system, and an adjusted path of the flow as effected by the deflector plate of the invention.
Figure 3:
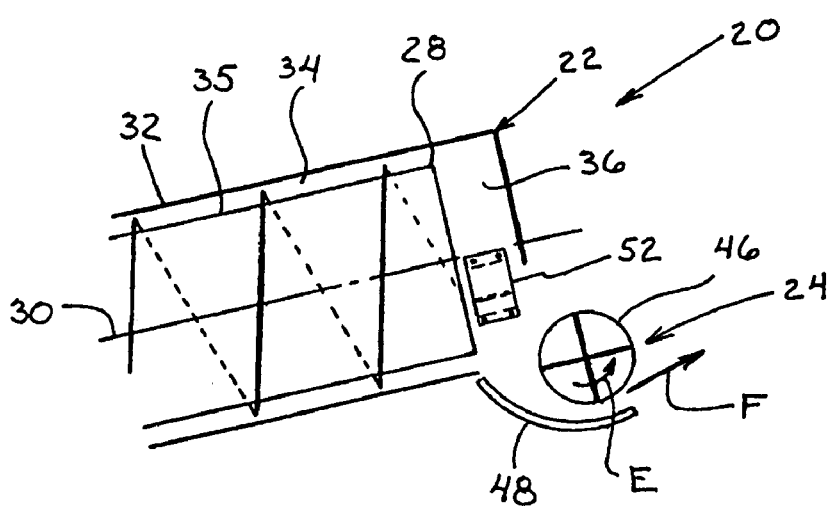
FIG. 3 is a simplified side plan view of the threshing system, deflector apparatus of the invention, and a beater or chopper.

As can be generally and essentially observed from a review and study of FIGS. 1-3, threshing system 22 is axially arranged in that it includes a cylindrical rotor 28 conventionally supported and rotatable in a predetermined direction, with arrow A in FIG. 2 denoting a typical clockwise, or forward, rotation, about a rotational axis 30 therethrough and within a concave 32, for conveying a flow of crop material in a helical flow path through a space 34 extending circumferentially around an outer cylindrical surface 35 of rotor 28 and an inner circumferential surface of concave 32. As the crop material is moved through space 34, the crop, such as grain, legumes, or the like, will be loosened and separated from crop residue such as husk and pods, and carried away therefrom in the well known conventional manner.

As may be observed from FIG. 3, the crop residue will continue along a helical path through space 34, and will be discharged or expelled therefrom into a discharge opening and through a discharge passage 36, which essentially comprises an extension of space 34 at the downstream end of rotor 28. Some of the flow expelled through discharge passage 36 will tend to be directed to flow generally downwardly along internal side 38 (FIG. 2), while some portions of the flow will be directed and/or be carried by rotating rotor 28 and momentum, in a transverse direction, denoted by arrow C in FIG. 2, toward an opposite internal side of combine 20, and will eventually flow downwardly toward the beater or chopper 46 of crop residue distribution system 24, such as denoted by arrows C2.

The consistency of the flow of crop residue, volume thereof, and extent or pattern thereof, will typically vary, and be a function of a variety of conditions, including, but not limited to, a speed of rotation in direction A of rotor 28, crop type, plant maturity, moisture content, and weather conditions. As an example, rotor speeds can vary between just a few hundred rpm and over a thousand rpm. Wheat and other small grains will typically have relatively small crop residue components, whereas other grains, such as corn, will typically have larger components, such as thick stalk segments, cob fragments, and large leaves. Typically, as observable in FIG. 2, the downward flow of crop residue will be more to a right hand side of a front-to-rear extending vertical centerline 40 of both threshing system 22 and crop residue distribution system 24. The sideward extent of such typical downward flow is represented by extent D in FIG. 2, and is generally bounded on the left hand side by a line 42 extending generally downwardly on the left of centerline 40, and on the right hand side by a line 44 extending generally downwardly from internal side 38, the sideward or transverse location of line 42 and thus the transverse extent D of the downward flow varying as a function of one or more of the above conditions and/or parameters.

Here, it should be noted that crop residue distribution system 24 will typically include a rotary device, such as a beater or chopper 46 (see FIG. 3), rotatable in a direction E above a concave pan 48. Chopper 46 typically rotates at a rapid speed, so as to be capable of accelerating and propelling a flow of crop residue rearwardly within the confines of the rear end of combine 20, as generally denoted by arrows F. Such rearward flow is typically guided and directed by internal panels or shields, generally denoted by shields 50 (FIG. 1), so as to either flow into a crop residue chopper and/or spreader, such as chopper/spreader 26, hereinafter referred to as a spreader, or through a rear opening so as to be deposited directly onto a field.

Typically, spreader 26 will be operated so as to distribute the crop residue in a layer on a swath of a field being harvested by combine 20. As noted hereinabove, it is often desirable for the crop residue to be distributed evenly or uniformly over the swath, for a variety of purposes, important among which is uniform emergence of subsequently planted crops, and uniform application of chemicals and fertilizers onto the field.

As has also been noted hereinabove, it has previously been noted that heavier flow of crop residue into one side or the other of chopper 46 will result in the propulsion of more crop residue toward a corresponding side of a spreader apparatus, such as spreader 26, with a result of a heavier layer or distribution of crop residue on a corresponding side of a swath over a field. For the reasons set forth above, such uneven deposition of crop residue on a field is undesirable in many instances.

Figure 4:
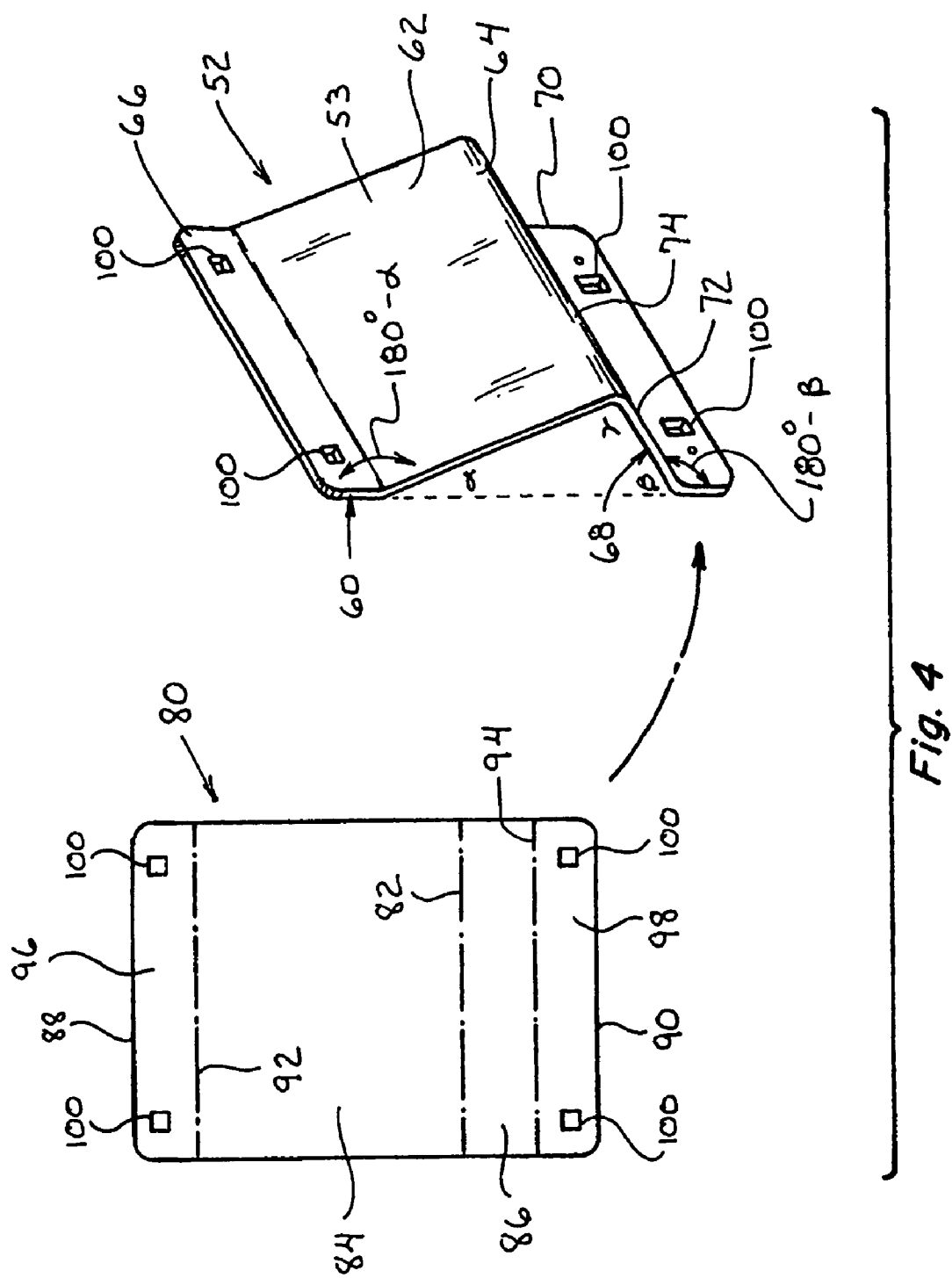
FIG. 4 is a perspective view depicting in better detail the deflector apparatus of FIG. 3 and illustrating a manner in which such deflector apparatus can be formed from a rectangular plate-like body.

With reference now, also, to FIG. 4, the present invention, which has been developed to overcome this problem and to provide the ability to more uniformly distribute the flow of crop residue being introduced to the chopper of a combine, such as chopper 46 of combine 20, resides in a rigid rotor discharge deflector apparatus 52 that includes rigidly braced upper ramp portion 53 that extends into the path of at least a portion of the crop residue flow B. More particularly, upper ramp portion 53 extends into the crop residue flow so that at least portions of that crop residue flow which would flow along or close to side 38, will instead impinge or strike upper ramp portion 53 and be deflected downwardly thereby, as denoted by arrows B and B1 in FIG. 2.

Importantly, the downwardly directed crop residue flow, as illustrated by representative arrow B1, will be transversely shifted or moved in a transverse direction in the discharge passage, that is, more to the left of internal side 38 in such figures, depending on the transverse position and the slope of upper ramp portion 53. It will be understood that the farther upper ramp portion 53 extends transversely away from side 38, the farther the downwardly directed crop residue flow will be shifted in the transverse direction.

Addressing FIG. 2 more particularly, it should be noted and understood that the transverse movement or shifting of downwardly directed flow B1 causes a corresponding transverse shift of other portions of the downwardly directed flow in the transverse direction, as illustrated by arrows C1. Thus, it has been found that the overall transverse extent of the downward flow of crop residue, denoted by extent D1, extending between lines 54 and 56, can be transversely moved or shifted by use of a deflector apparatus, such as the rigid rotor discharge deflector 52 and its braced upper ramp portion 53, in the path of portions of flow B in the vicinity of internal side 38 of the combine.

Thus, for a combine including a crop residue distribution system, such as system 24 including a rotary chopper 46, the transverse position or location of crop residue inflow can be adjusted, for example, to be more uniformly distributed with a vertical centerline of the distribution system, such as centerline 40, which is a joint centerline of rotor 28 of threshing system 22 and chopper 46 of distribution system 24, as illustrated by the location of the center of transverse extent D1 in FIG. 2.

As viewed in FIGS. 2 and 3, in its normal, forward operation rotor 28 is rotated in a clockwise direction, making the right side of concave 32 the downward swept side and the left hand side of concave 32 the upward swept side. Discharge deflector apparatus 52, with its upper ramp portion 53, is shown being mounted within the discharge passage 36 at the downstream end of rotor 28 at approximately the level of the axis 30 of rotor 28 at its downstream end, with upper ramp portion 53 extending into the flow of crop residue to intercept at least a portion of the crop residue as the crop residue is helically expelled from the upper portion of rotor residue passage 34 on the downward swept side of rotor 28 and to deflect the intercepted flow so that crop residue will be more uniformly introduced to chopper 46.

Figure 12:
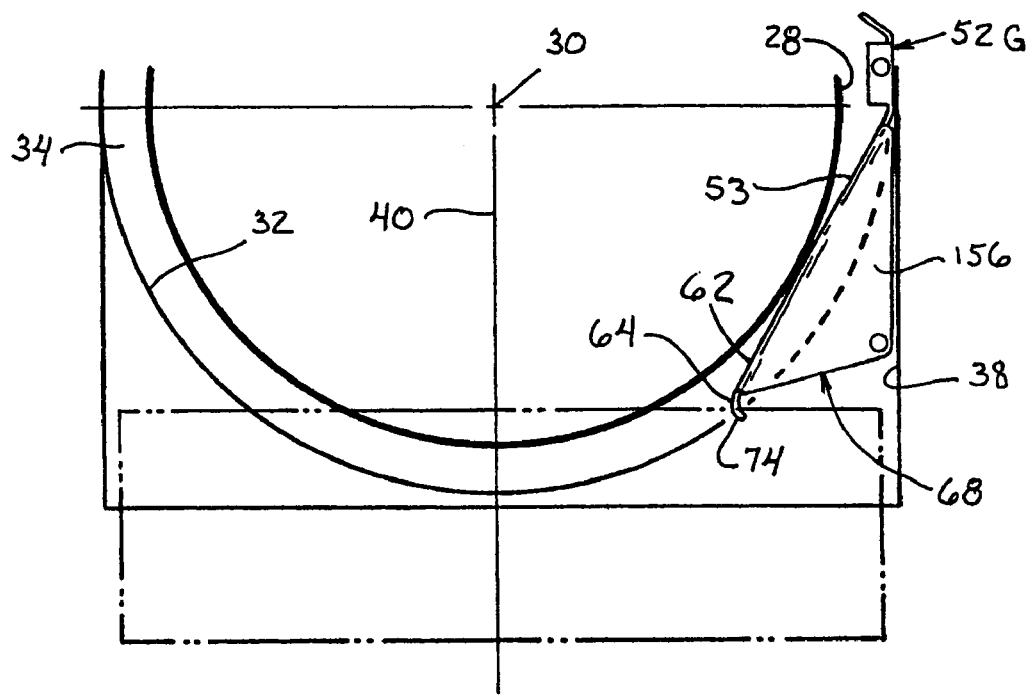
FIG. 12 is a fragmentary plan view at the rear of the rotor of the combine of FIG. 1, illustrating the positioning of the rigid rotor discharge deflector of FIG. 11 in the discharge passage and the attachment thereof to the side wall at the downswept side of the rotor.

FIGS. 4-12 depict in further detail various embodiments of discharge deflectors according to the present invention and include a number of common features and components. Generally the various discharge deflectors preferably are constructed of a rigid, abrasion resistant material, such as sheet metal or the like, and are configured to be securably mountable at a suitable location, such as on internal side 38 as best shown in FIGS. 2, 3, and 12. Such discharge deflectors include a body member 60 that has a face portion 62 with a ridge portion 64 thereon extending laterally across at least a portion of the face portion 62, an upper body portion 66 above the level of ridge portion 64, an upper ramp portion 53 sloped and extending outwardly at a fixed angle from the upper body portion 66 to ridge portion 64, and a bracing 68 associated with upper ramp portion 53 maintaining ridge portion 64 essentially fixed relative to side wall 38 and upper ramp portion 53 at essentially the fixed angle. In some embodiments, bracing 68 may include a lower body portion 70 below the level of the ridge portion 64 and a lower ramp portion 72 which slopes and extends at a given angle from the ridge portion 64 back towards lower body portion 70. The ridge portion 64 will typically include a rolled lip 74 therewith, such as at the juncture of upper ramp portion 53 and lower ramp portion 72.

With particular reference to FIG. 4, it may be observed that discharge deflector 52 may be formed from a unitary, rectangular plate of material, such as rectangular plate 80, by bending such plate back on itself along horizontal line 82 to define a primary bend and respective upper and lower side portions 84 and 86 on the upper and lower sides of the primary bend. A generally horizontal counter-bend may be applied to each of such upper and lower side portions 84 and 86 at intermediate locations between the primary bend and the respective upper and lower edges 88 and 90 of the upper and lower side portions 84 and 86, such as at respective horizontal lines 92 and 94, to form flange portions 96 and 98 along such edges. The rectangular plate 80 as so bent would thus have a configuration resembling a V-shape rotated by 90°, with the leg portions of such V-shape defining the oppositely sloped upper and lower ramp portions 53 and 72. The flange portions 96 and 98 may be attachable to the side wall by way of threaded bolts inserted through openings 100 in the flange portions 96, 98 and corresponding openings in side wall 38 and the installation of nuts on the threaded ends of the bolts. Preferably, the upper ramp portion ray extend at approximately a 60° angle relative to the side wall, with the lower ramp portion extending at approximately a 30° angle relative to the side wall and the angle at the primary bend being approximately 75°.

Figure 5:
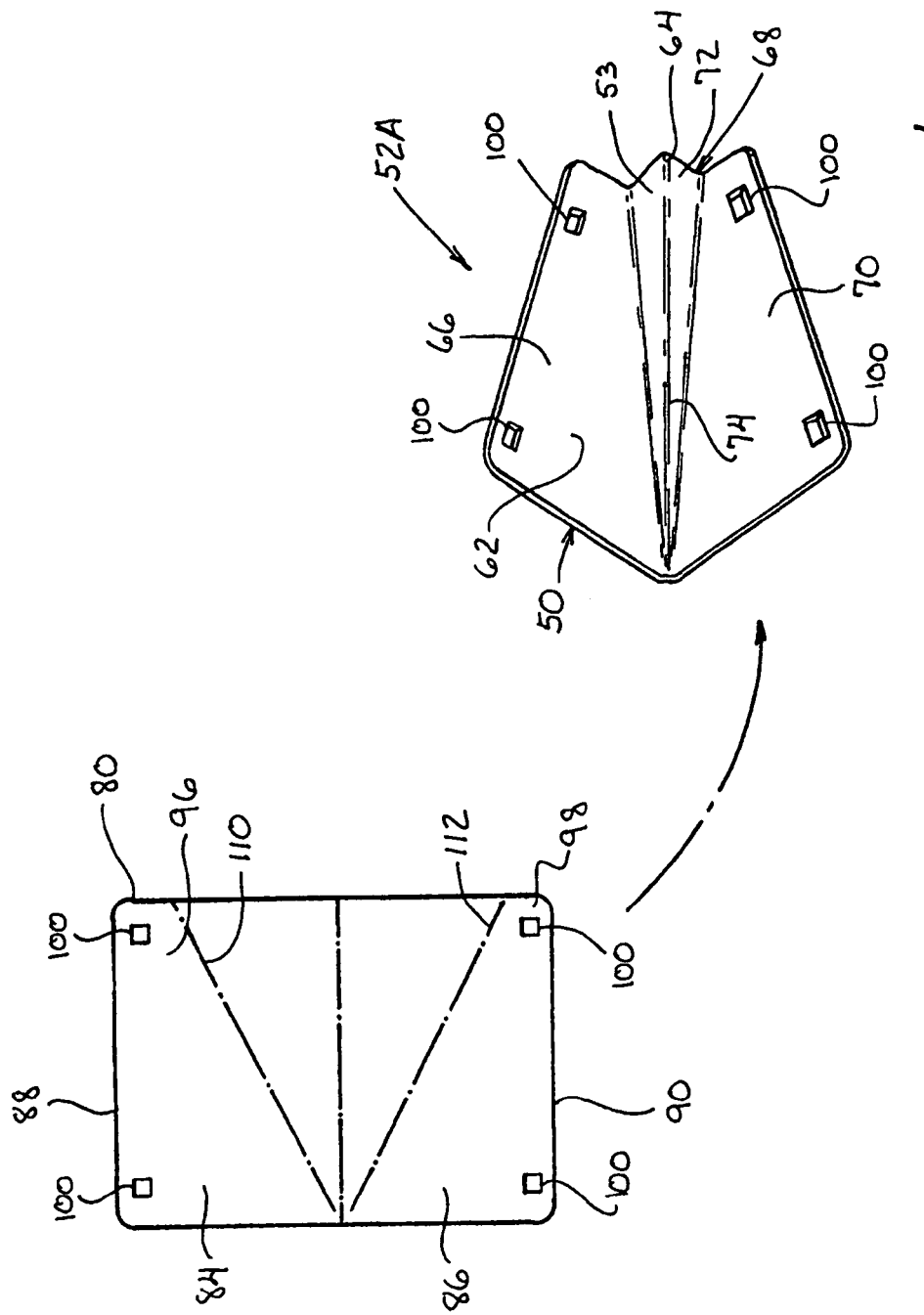
FIG. 5 is a perspective view of another embodiment of a deflector apparatus according to the present invention and illustrating a manner in which such deflector apparatus can be formed from a rectangular plate-like body.

FIG. 5 depicts an alternate embodiment, also formed from unitary, rectangular plate 80, and bent along horizontal line 82 to form a primary bend, but wherein an angled counterbend is applied to upper side portion 84 along line 110 and an angled counterbend is applied to lower side portion 86 along line 112, resulting in discharge deflector 52A.

Figure 6:
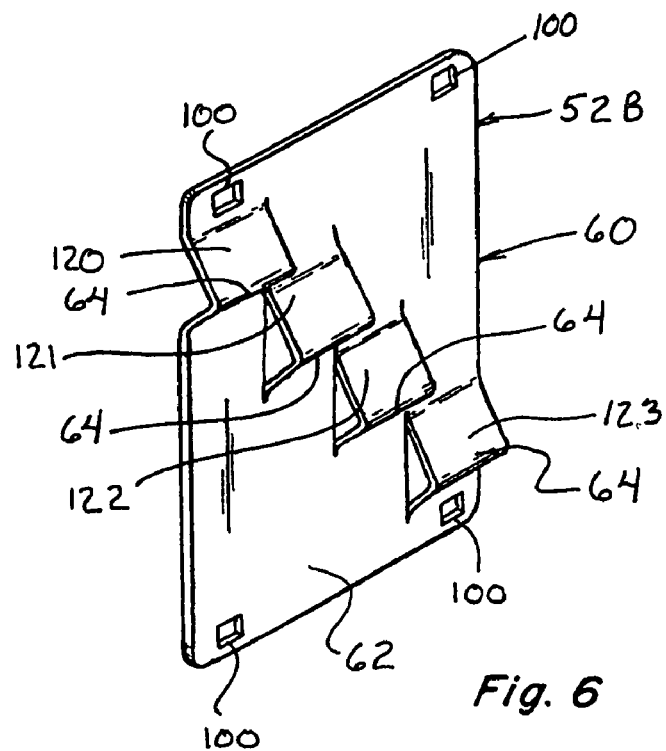
FIGS. 6-7 are perspective views of further embodiments of a deflector apparatus according to the present invention that can be formed from a unitary plate-like member of generally rectangular shape.
Figure 7:
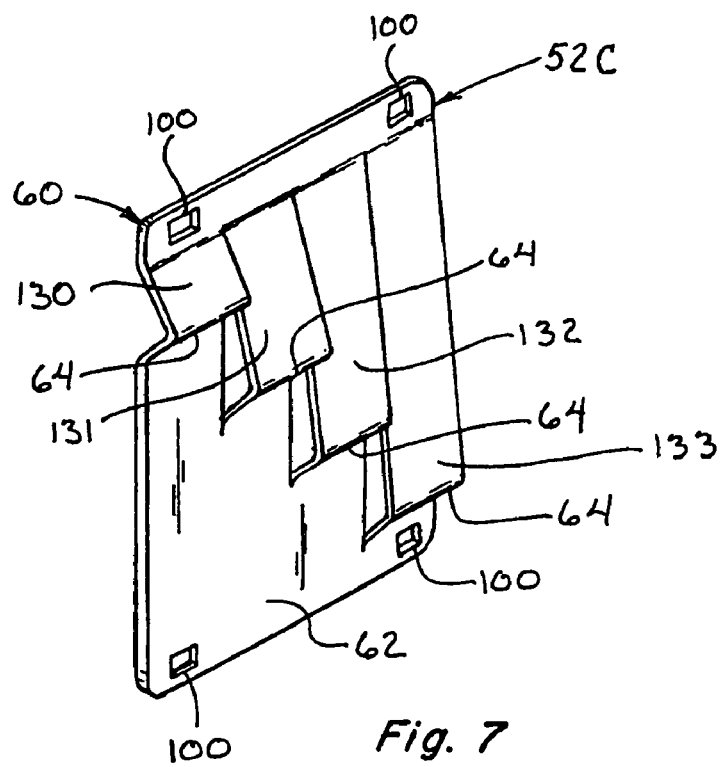

FIGS. 6 and 7 depict further discharge deflector embodiments 52B and 52C that may be formed in somewhat similar manners from a unitary plate and which have a plurality of distinguishable upper ramp portions, such as the upper ramp portions 120-123 and 130-133.

Figure 8:
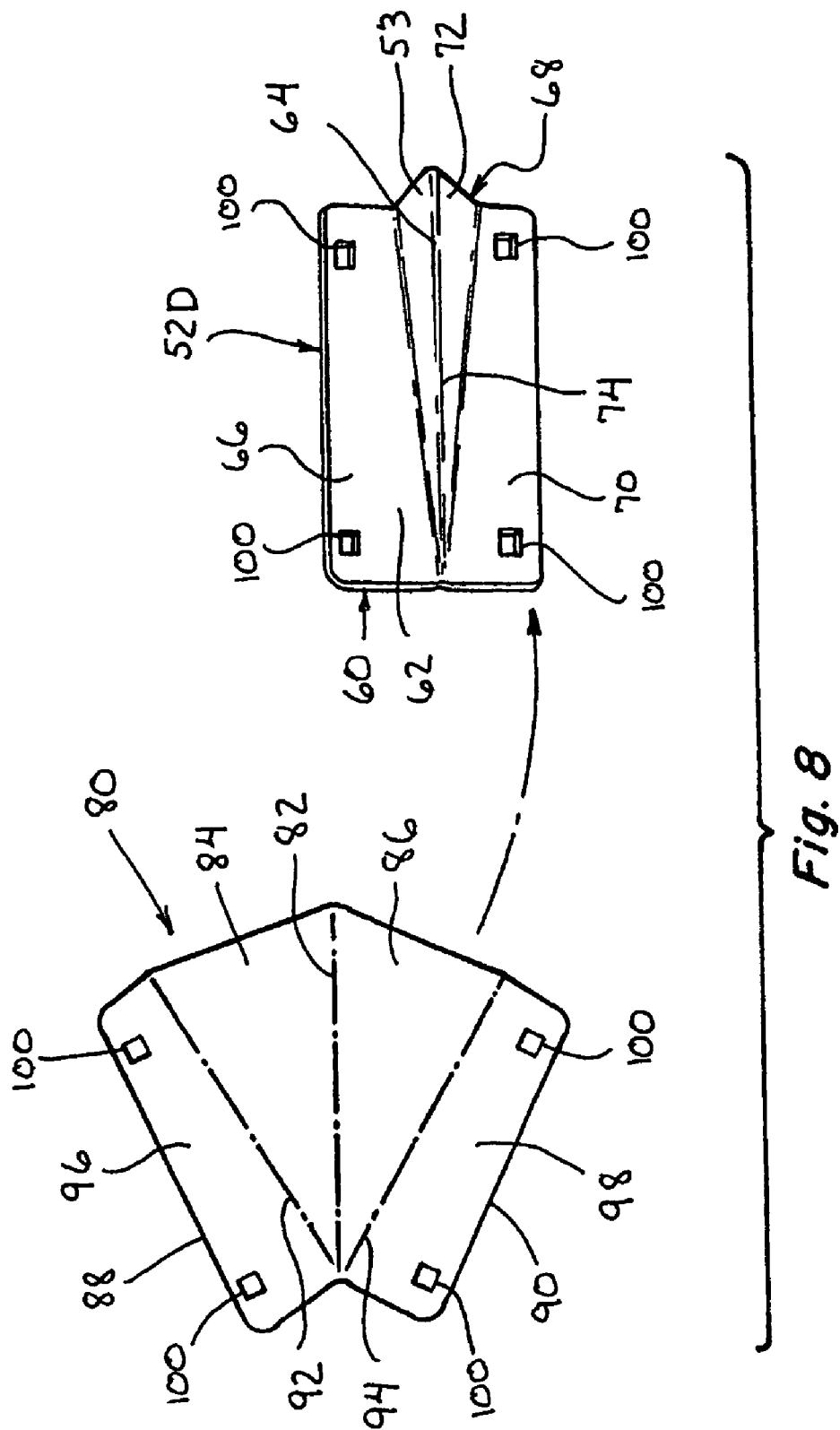
FIGS. 8-10 are perspective views of additional embodiments of a deflector apparatus according to the present invention, formed from a unitary plate-like member to have a generally rectangular footprint after formation.
Figure 9:
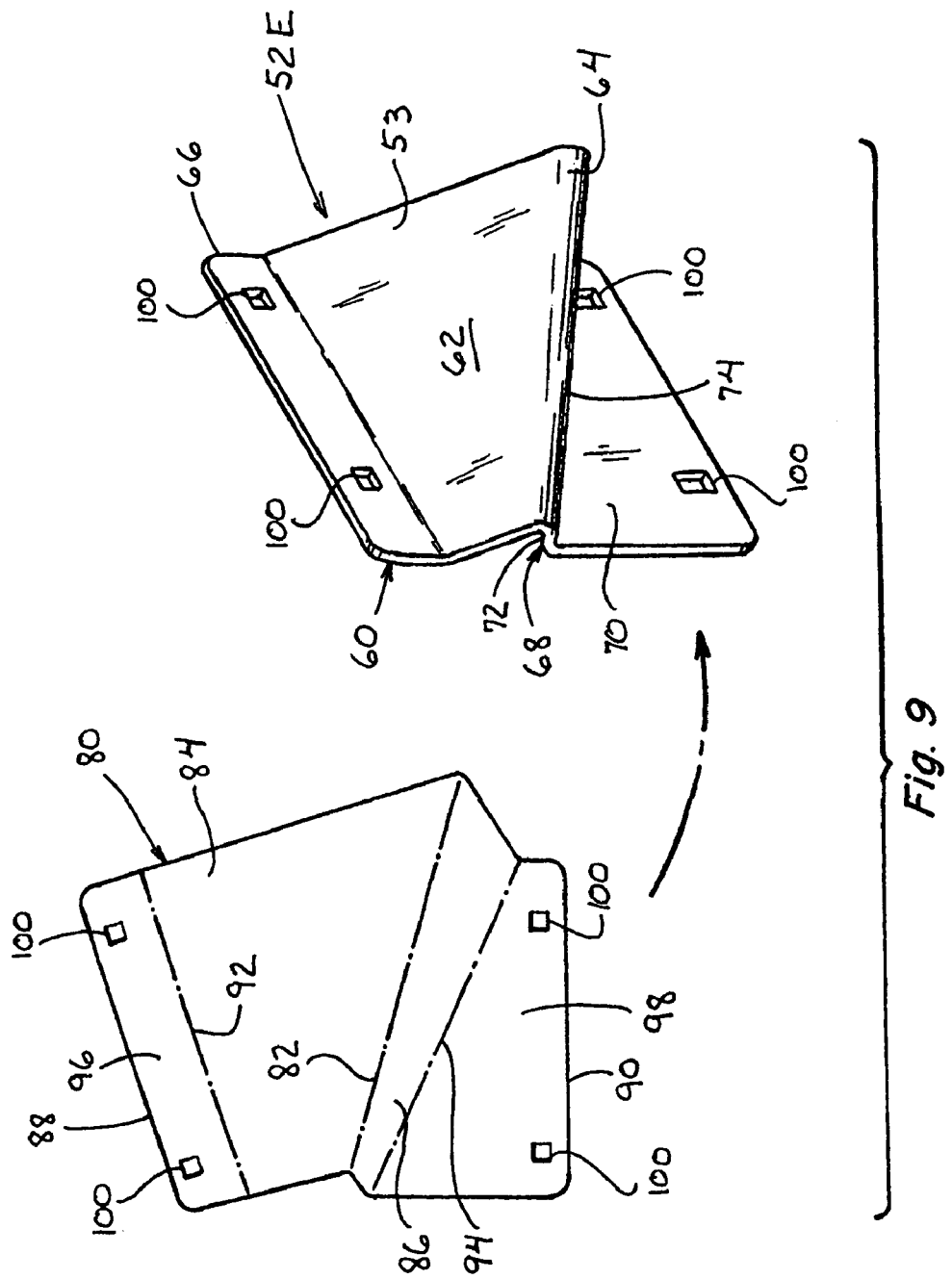
Figure 10:
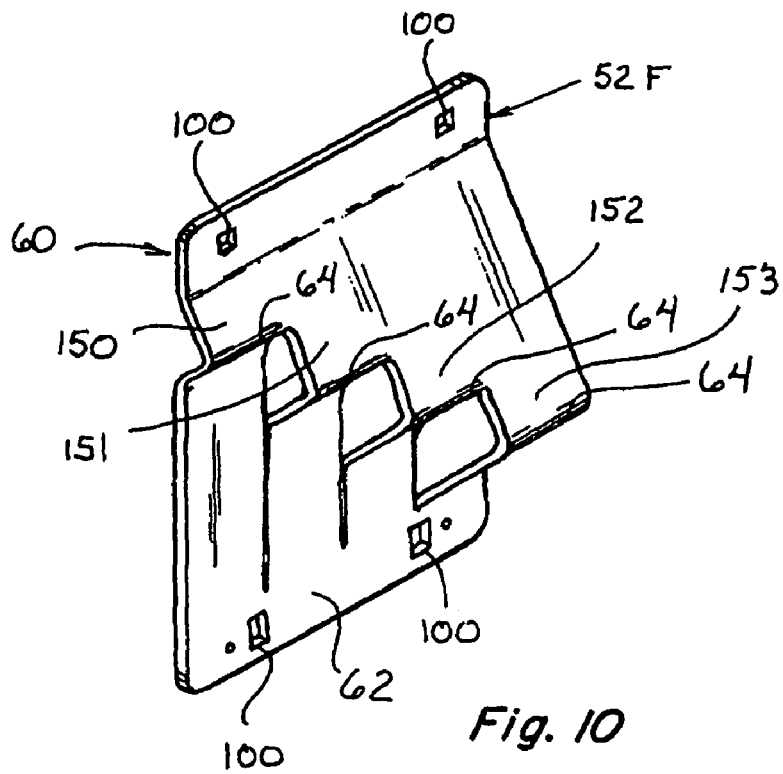

For mounting or other purposes, it is sometimes desired that the formed discharge deflectors have a generally rectangular footprint. In such event, it may be desired that the discharge deflector be formed from a somewhat fan-shaped or other shaped plate, rather than a rectangular plate, so that the formed construction will have a rectangular footprint. FIG. 8 illustrates how a discharge deflector 52D, similar in some respects to discharge deflector 52A, could be formed from the fan-shaped plate 138, while FIGS. 9-10 illustrates other discharge deflectors 52E and 52F that could be similarly formed from different fan-shaped or other shaped plates, with discharge deflector 52F including a plurality of upper ramp portions 150-153.

Figure 11:
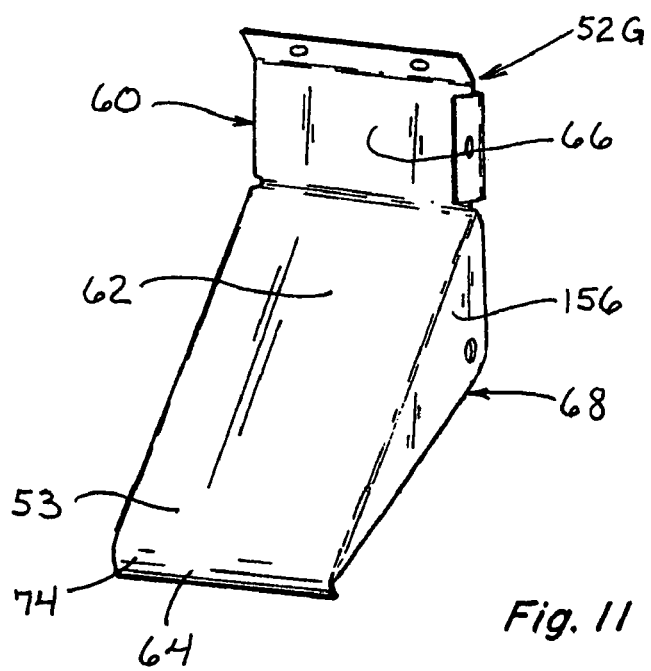
FIG. 11 is a perspective view of anther embodiment of a deflector apparatus according to the present invention, illustrating the use of side supports as bracing for the upper ramp portion of the rigid rotor discharge deflector.

While the various embodiments of FIGS. 4-10 include lower ramp portions and flange portions that serve as bracing for the upper ramp portions, other discharge deflector embodiments may employ different bracing, including one or more supports, or a solid supporting structure, beneath or extending to the backside or to the sides of the upper ramp portion. For example, FIGS. 11-12 depict a preferred alternate discharge deflector 52G, and the installation thereof at side wall 38, that includes side support portions 156 along each side of the construction, extending from adjacent the side wall 38 to the backside of upper ramp portion 53 and ridge portion 64. Such support portions form a portion of the bracing, and the rolled lip 74 further enhances the rigidity of the construction at that point in addition to helping to prevent damage to the discharge deflector in the event of rotor reversal by allowing the crop residue to slide over and around the lip without hairpinning.

Figure 13:
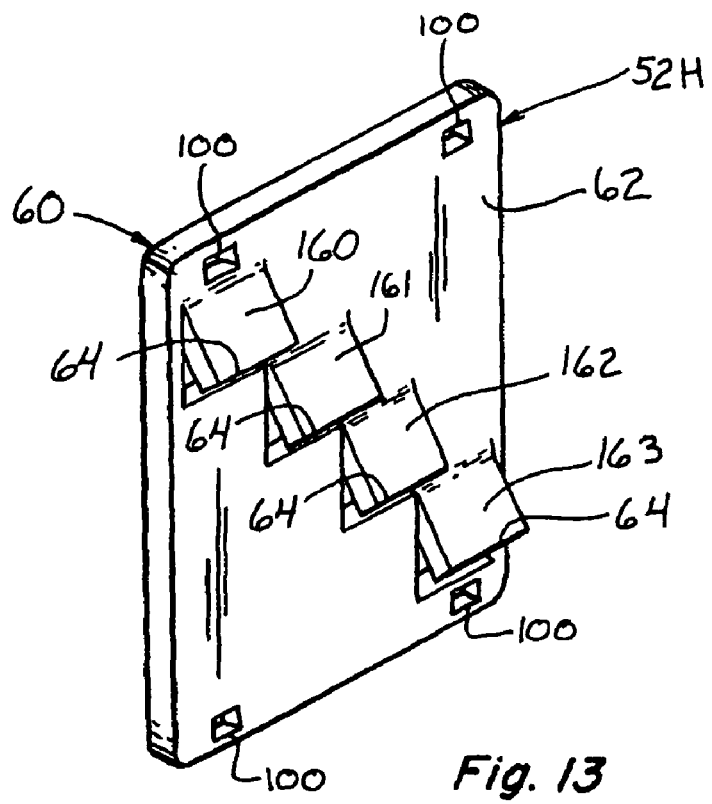
FIG. 13 a perspective view of still another embodiment of a deflector apparatus according to the present invention which has a plurality of upper ramp portions.

FIG. 13 depicts a still further discharge deflector embodiment 52H having a body 60 formed from a material plate and having a plurality of upper ramp portions 160-163 formed on the body, each of which ramp portions is braced by the thickness and bulk of the body and its material, and the material, thickness, and size of the upper ramp portions, especially relative to the entirety of such body. Typically, such body could be positioned on side wall 38 approximately three inches (76 mm) below the height of the axis of the rotor, and need extend towards the rear of the combine only a short distance since only a small length of deflector, on the order of one to three inches (25-76 mm), can serve to divert an adequate portion of the crop residue flow. In such embodiment, the four upper ramp portions are angled similarly, although they could be angled differently if so desired. Such embodiment, like the discharge deflector embodiments of FIGS. 6, 7 and 10, permits the concentrated flow of crop residue along side wall 38 to be separated into a plurality, in this case four, separate flow streams that are deflected transversely across the discharge passage in order to effect a more uniform introduction of crop residue to chopper 46.

Although, in the illustrations herein and in the foregoing discussions, the upper and lower ramp portions have had faces that are generally straight and flat, it should be recognized that, in the practice of the present invention, the faces of such ramp portions need not necessarily be straight and flat, and that concave or convex or faceted faces could also be employed so long as the upper ramp portions are braced and remain essentially fixed and inflexible in normal use. Likewise, it should be understood that the backsides of such ramps need be of no particular form and could even extend back to and rest against the side wall so as to provide bracing for the upper ramp portions.

Figure 14:
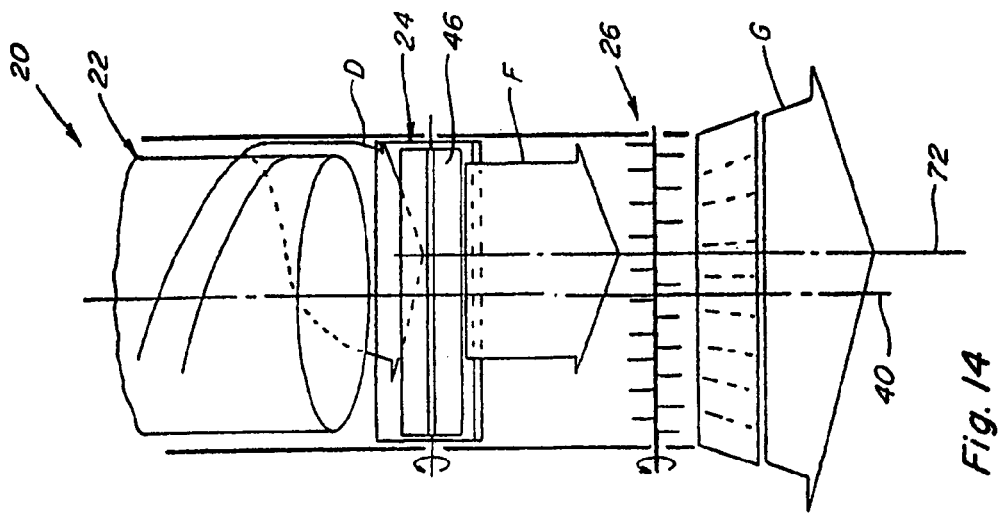
FIG. 14 is a simplified top plan view of a rear end of the combine, showing the threshing system, crop residue distribution system, and a crop residue chopper/spreader apparatus of the combine, and illustrating crop residue flow through the rear end of the combine and a relationship of crop residue discharged from the combine in relation to an axial centerline thereof.

All of such discharge deflector embodiments, and other embodiments according to the present invention, including embodiments that may include other numbers of upper ramp portions, varying angles and slopes, and other bracing, can thus be utilized and employed to deflect a portion of the crop residue flow from the rotor so as to better distribute the crop residue across the width of the chopper, the significance of which can be better understood by reference to FIG. 14. Such figure generally depicts typical crop residue flow characteristics that have previously been encountered with flow from an axially arranged threshing system 22 of a combine 20 into a chopper 46, and from there, into and from a crop residue spreader 26. It can be observed in such figure that flow D from threshing system 22 is centered about a centerline 72 which is offset from centerline 40 of threshing system 22. With such configuration, the crop residue flow F that is propelled rearwardly by chopper 46 is similarly offset in the same direction and centered about centerline 72. Flow F flows into crop residue spreader 26 in the offset manner, and spreader 26, in turn, propels the crop residue from the rear end of combine 20 in a similarly offset manner, as illustrated by large arrow G. As a result, the crop residue is spread unevenly over a swath of the field.

Figure 15:
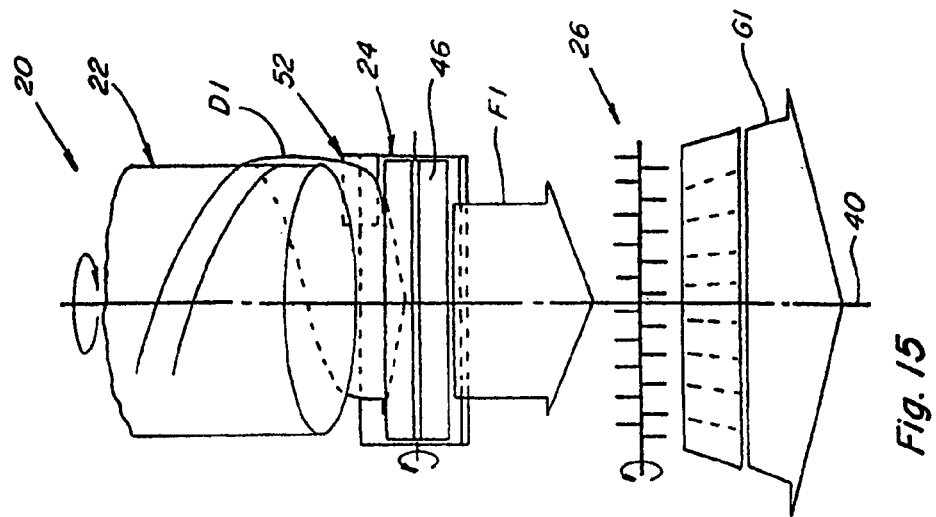
FIG. 15 is another simplified top plan view of the combine, showing the threshing system, deflector apparatus of the invention, residue distribution system and chopper/spreader apparatus, illustrating alignment of crop residue flow with an axial centerline as the result of the present invention.

In contrast, as depicted in FIG. 15, utilization of the present invention in association with threshing system 22 of combine 20, results in a deflection of crop residue flow D1 into chopper 46 in a more uniform manner, and the consequent, more centered and uniform discharge of crop residue from distribution system 22 relative to centerline 40, as is illustrated by the location of the center of arrow F1. The crop residue flow is therefore inducted into spreader 26 in a more centered manner and uniform manner, and so as to be propelled from the rear end of combine 20 in a more centered and uniform relationship to centerline 40, as illustrated by arrow G1.

Figure 16:
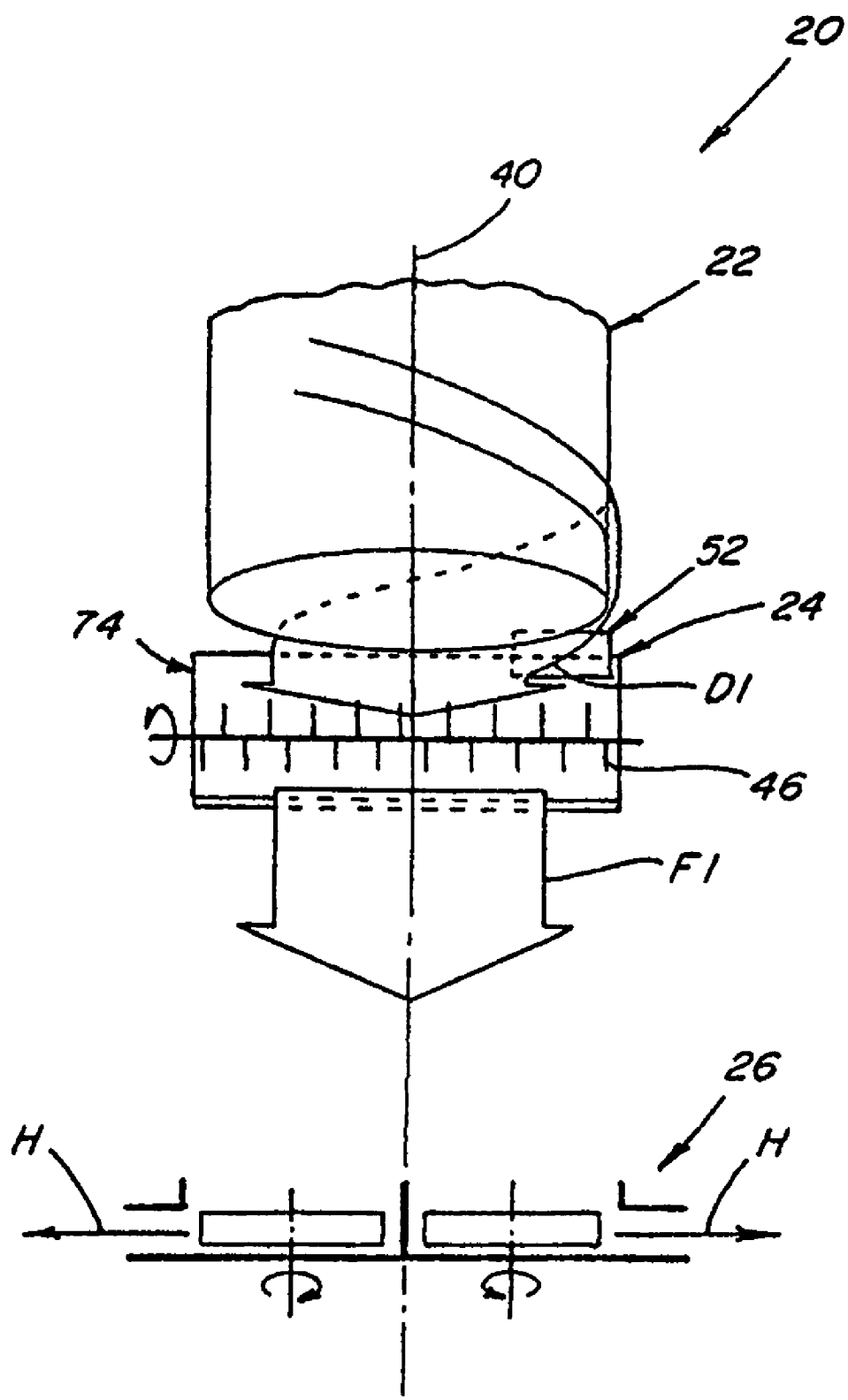
FIG. 16 is still another simplified top plan view of the combine, showing the threshing system, deflector apparatus of the invention, and an alternative residue spreader apparatus, illustrating alignment of crop residue flow with an axial centerline of the combine resulting from the present invention.

In FIG. 16, a different embodiment of a crop residue spreader 26 is illustrated, including a pair of impellers rotatable about horizontal axes for discharging crop residue in opposite sideward directions, as illustrated by arrows H. Again, the centered flow of crop residue F1 from chopper 46 and into spreader 26 results in more even inflow into spreader 26, such that outflows H will be more even, resulting in more uniform spreading characteristics.

In light of all the foregoing, it should thus be apparent to those skilled in the art that there has been shown and described a rigid rotor discharge deflector apparatus that can be utilized to effect a more uniform distribution of crop residue from the rotor of a combine to the chopper. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A rigid rotor discharge deflector for a combine having a generally longitudinally disposed rotor feeding crop residue into a discharge passage above a chopper apparatus, the discharge passage having spaced side walls, comprising a body mounted to the side wall of the discharge passage on the downswept side of the rotor, and, when so mounted, having a face with upper and lower edges, the face extending from generally adjacent to the downstream end of the rotor rearwardly towards the rear of the combine, said face of said body including at least one ridge portion extending across at least a portion of said face, an upper portion having the upper edge, wherein the upper portion is above said ridge portion, and an upper ramp portion sloped and extending from said upper portion of said body to said ridge portion in a fixed and inflexible manner, said body including a bracing associated with said upper ramp portion and said ridge portion maintaining said ridge portion essentially fixed and inflexible relative to the side wall and maintaining said upper ramp portion essentially fixed in position relative to the side wall and preventing flexure thereof under normal forward operating conditions of the rotor, wherein said bracing includes a lower portion having the lower edge, wherein the lower portion is below said ridge portion and a lower ramp portion sloped and extending from said ridge portion towards said lower portion of said body in a fixed and inflexible manner, wherein said ridge portion includes a lip at the juncture between said upper ramp portion and said lower ramp portion having opposed ends, the ends of said lip being at different fixed distances from the sidewall, wherein said lip end closer to the side wall is considered to be the lower end, said lip end farther from the side wall is considered to be the higher end, and said lip slopes outwardly generally uniformly from said lower to said higher end, wherein the lower end of the lip disposed adjacent the upper edge and the higher end of the in disposed adjacent the lower edge so that the ridge portion extends at an angle, with respect to the upper and lower edges, across at least a portion of said face, whereby at least a portion of the crop residue being discharged from the rotor into the discharge passage will impact said upper ramp portion without effecting flexure thereof and will be deflected and redirected thereby to be more uniformly laterally introduced into the chopper apparatus.

2. A rigid rotor discharge deflector for a combine having a generally longitudinally disposed rotor feeding crop residue into a discharge passage above a chopper apparatus, the discharge passage having spaced side walls, comprising a material plate having upper and lower edges and being bent laterally back on itself at a mid-height location to form a primary bend and to define upper and lower side portions above and below said primary bend, wherein said primary bend extends at an angle across a portion of the plate with respect to the upper and lower edges, said upper side portion being counterbent at a position between said primary bend and said upper edge to form an upper bend and to define a upper flange portion along said upper edge, said lower side portion being counterbent at a position between said primary bend and said lower edge to form a lower bend and to define a lower flange portion along said lower edge, said primary, upper, and lower bends being so related to one another to position said upper and lower flange portions to be in essentially the same plane and to define a ridge portion along said primary bend, wherein the ridge portion has one end adjacent the upper edge of the plate and another end adjacent the lower edge of the plate, an upper ramp portion above said primary bend, and a lower ramp portion below said primary bend, said upper and lower flange portions being securably attached to one of said side walls, said upper ramp portion being braced by said lower ramp portion and the attachment of said upper and lower flange portions to said one of said side walls to maintain said ridge portion essentially fixed and inflexible relative to said one of said walls and said upper ramp portion at an essentially fixed and inflexible position relative to said one of said side walls and to prevent flexure thereof under normal forward operating conditions of the rotor.

3. The rigid rotor discharge deflector of claim 2 wherein said primary bend extends generally horizontally laterally across the material plate.

4. The rigid rotor discharge deflector of claim 3 wherein said upper and lower bends extend generally horizontally laterally across the material plate.

5. The rigid rotor discharge deflector of claim 4 wherein said upper flange and said upper ramp portion define an angle of approximately 120° at said upper bend.

6. The rigid rotor discharge deflector of claim 4 wherein said lower flange and said lower ramp portion define an angle of approximately 150° at said lower bend.

7. The rigid rotor discharge deflector of claim 4 wherein said upper and lower ramp portions define an angle of approximately 75° at said primary bend.

8. The rigid rotor discharge deflector of claim 4 wherein said upper and lower bends are angled relative to said primary bend.

9. The rigid rotor discharge deflector of claim 8 wherein said upper and lower bends are angled oppositely from one another relative to said primary bend.

10. The rigid rotor discharge deflector of claim 4 wherein said material plate is approximately rectangular in shape prior to being bent.

11. The rigid rotor discharge deflector of claim 4 wherein said plate, subsequent to being bent, has an approximately rectangular footprint.

* * * * *